(12) United States Patent
Todd

(10) Patent No.: US 11,294,990 B2
(45) Date of Patent: Apr. 5, 2022

(54) METHOD AND SYSTEM FOR DATA LICENSE AGREEMENTS AND LICENSEE AUDITABILITY

(71) Applicant: EMC IP Holding Company LLC, Hopkinton, MA (US)

(72) Inventor: Stephen James Todd, North Conway, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 313 days.

(21) Appl. No.: 16/523,231

(22) Filed: Jul. 26, 2019

(65) Prior Publication Data
US 2021/0026931 A1 Jan. 28, 2021

(51) Int. Cl.
*G06F 21/10* (2013.01)

(52) U.S. Cl.
CPC .... *G06F 21/105* (2013.01); *G06F 2221/0773* (2013.01)

(58) Field of Classification Search
CPC .......... G06F 21/105; G06F 2221/0773; G06F 21/64; G06F 21/10; H04L 63/0428; H04L 63/1416
See application file for complete search history.

(56) References Cited

U.S. PATENT DOCUMENTS

| | | | |
|---|---|---|---|
| 8,914,639 B2 | 12/2014 | Hogan | |
| 8,954,731 B2 | 2/2015 | Tenenboym et al. | |
| 9,009,477 B2 | 4/2015 | Das | |
| 9,276,749 B2 | 3/2016 | Tenenboym et al. | |
| 9,768,965 B2 | 9/2017 | Tenenboym et al. | |
| 10,216,921 B1 | 2/2019 | Janse Van Rensburg | |
| 10,523,526 B2* | 12/2019 | Dementev | H04L 41/50 |
| 2006/0021063 A1* | 1/2006 | Hori | H04L 9/3066 726/27 |
| 2011/0306027 A1* | 12/2011 | Bridges | G09B 5/00 434/322 |
| 2018/0330385 A1* | 11/2018 | Johnson | G06Q 10/1053 |
| 2019/0108364 A1* | 4/2019 | Roennow | G06Q 20/389 |
| 2019/0108482 A1* | 4/2019 | Vikas | G06Q 10/0838 |
| 2019/0155997 A1* | 5/2019 | Vos | H04L 9/3239 |
| 2019/0238327 A1* | 8/2019 | Li | G06F 16/1824 |
| 2020/0014527 A1* | 1/2020 | Subramaniam | G06F 21/64 |
| 2020/0159889 A1* | 5/2020 | Chui | H04L 67/104 |
| 2020/0387585 A1* | 12/2020 | Martinez | G06Q 30/0601 |

\* cited by examiner

*Primary Examiner* — Sanchit K Sarker
(74) *Attorney, Agent, or Firm* — Chamberlain, Hrdlicka, White, Williams & Aughtry

(57) ABSTRACT

A method for managing data use operations in accordance with one or more embodiments of the invention includes sending, by a licensed data transfer engine executing on a local data manager, a license verification request to a data management system, obtaining a license verification response, providing licensed data to a client, and sending a ledger entry to a ledger service based on the licensed data provided to the client.

14 Claims, 13 Drawing Sheets

METHOD AND SYSTEM FOR DATA LICENSE AGREEMENTS AND LICENSEE AUDITABILITY

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage.

SUMMARY

In general, in one aspect, the invention relates to a method for managing data use operations in accordance with one or more embodiments of the invention. The method includes sending, by a licensed data transfer engine executing on a local data manager, a license verification request to a data management system, obtaining a license verification response, providing licensed data to a client, and sending a ledger entry to a ledger service based on the licensed data provided to the client.

In one aspect, the invention relates to a non-transitory computer readable medium in accordance with one or more embodiments of the invention, which includes computer readable program code, which when executed by a computer processor enables the computer processor to perform a method for managing data use operations. The method includes sending, by a licensed data transfer engine executing on a local data manager, a license verification request to a data management system, obtaining a license verification response, providing licensed data to a client, and sending a ledger entry to a ledger service based on the licensed data provided to the client.

In one aspect, the invention relates to a system in accordance with in one or more embodiments of the invention, which includes a processor and memory which includes instructions, which when executed by the processor, perform a method for managing data use operations. The method includes sending, by a licensed data transfer engine executing on a local data manager, a license verification request to a data management system, obtaining a license verification response, providing licensed data to a client, and sending a ledger entry to a ledger service based on the licensed data provided to the client.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing license agreements. More specifically, embodiments of the invention include using a data management system to obtain the license agreements between clients and local data systems that provide licensed data. Embodiments of the invention may include methods for allowing the local data systems to determine whether to provide the data to the clients based on the license agreements.

Further, embodiments of the invention include functionality for auditing compliance with license agreements using a ledger service that stores information about data transferred, subject to one or more license agreements, from a local data system to the client. A data management system, or another entity, may interact with the ledger service to obtain ledger entries that each specify a point in time in which a data set was provided to a client. The obtained ledger entries may be provided to the clients that requested the information. The clients may then use the ledger entries to audit compliance with the license agreement terms.

Figure 1A:
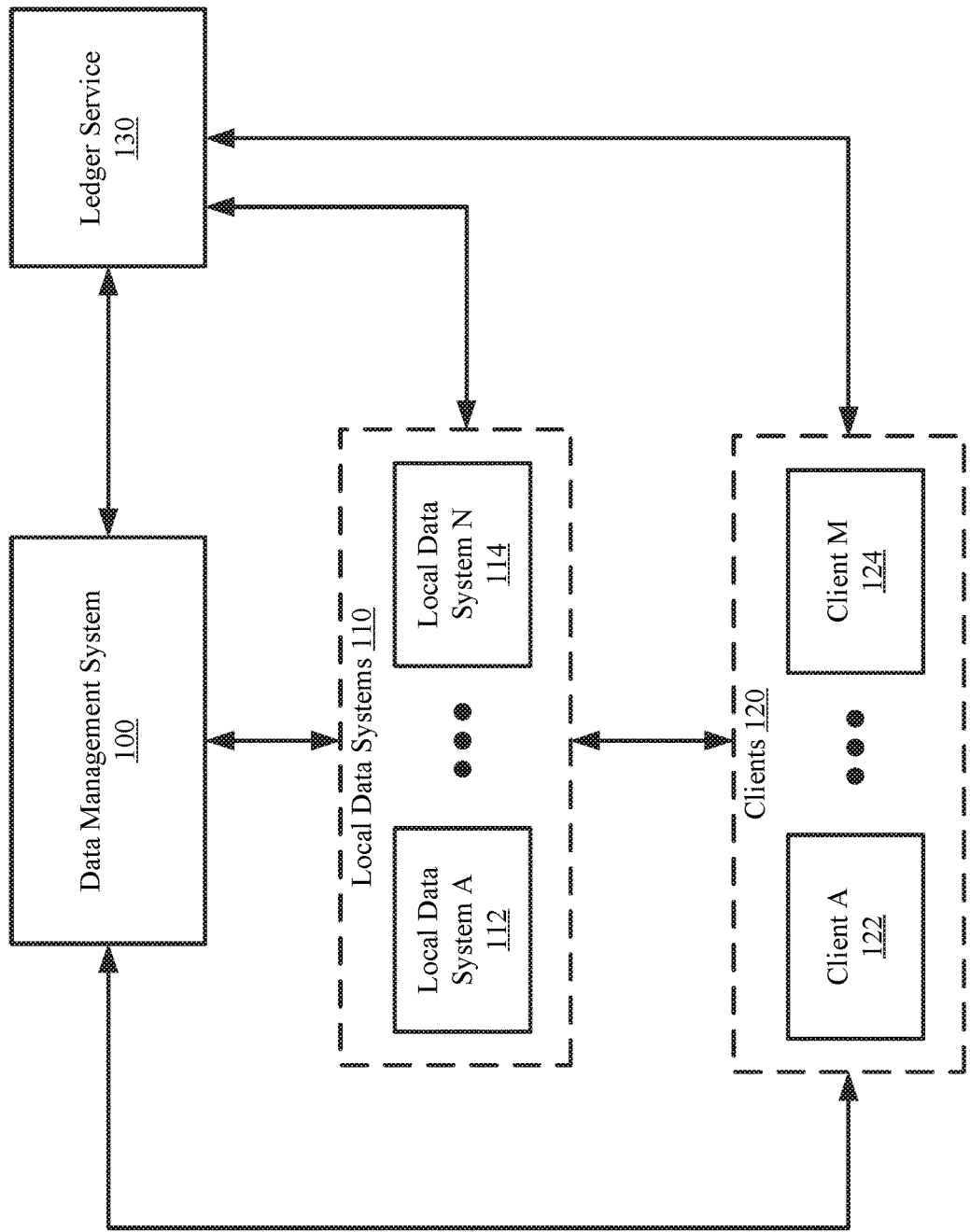
FIG. 1A shows a diagram of a system in accordance with one or more embodiments of the invention.

FIG. 1A shows a diagram of a system in accordance with one or more embodiments of the invention. The system includes a data management system (100), local data systems (110), and clients (120). Each component of the system may be operably connected via any combination of wired and/or wireless connections. Each component of the system illustrated in FIG. 1A is discussed below.

In one or more embodiments of the invention, the data management system (100) is a device that manages data. The data may be provided by a local data system (112, 114). The data management system may facilitate the management of data by storing information that specifies the data that may be sent from the local data system (110) to the clients (120). The information may be, for example, a license agreement that specifies accepted terms by the clients (120) following transactions taking place between the clients (120) and the data management system (100).

In one or more embodiments of the invention, the communication between the data management system (100) and the clients (120) includes participating in any type of distributed transaction ledger, e.g., blockchain based transaction, to complete the acceptance of the terms. A distributed transaction ledger may be a program executed by the data management system (100) and/or other entities that creates a record of and/or enforces agreed upon transactions. The record generated by the distributed transaction ledger may be a data structure that is distributed across any number of entities which creates an immutable record of each transaction processed by the distributed transaction ledger. The data management system (100) may complete transactions via methods other than participation in a distributed transaction ledger without departing from the invention.

In one or more embodiments of the invention, the data management system (100) facilitates transactions using smart contracts. A smart contract may be a program executing via a distributed transaction ledger (see, e.g., 130) that facilitates the exchange of a currency (e.g., bitcoins) supported by the distributed transaction ledger. Upon execution of a smart contract, the smart contract may automatically exchange the currency and any access information (discussed below) between the parties that entered into the smart contract.

Figure 4:
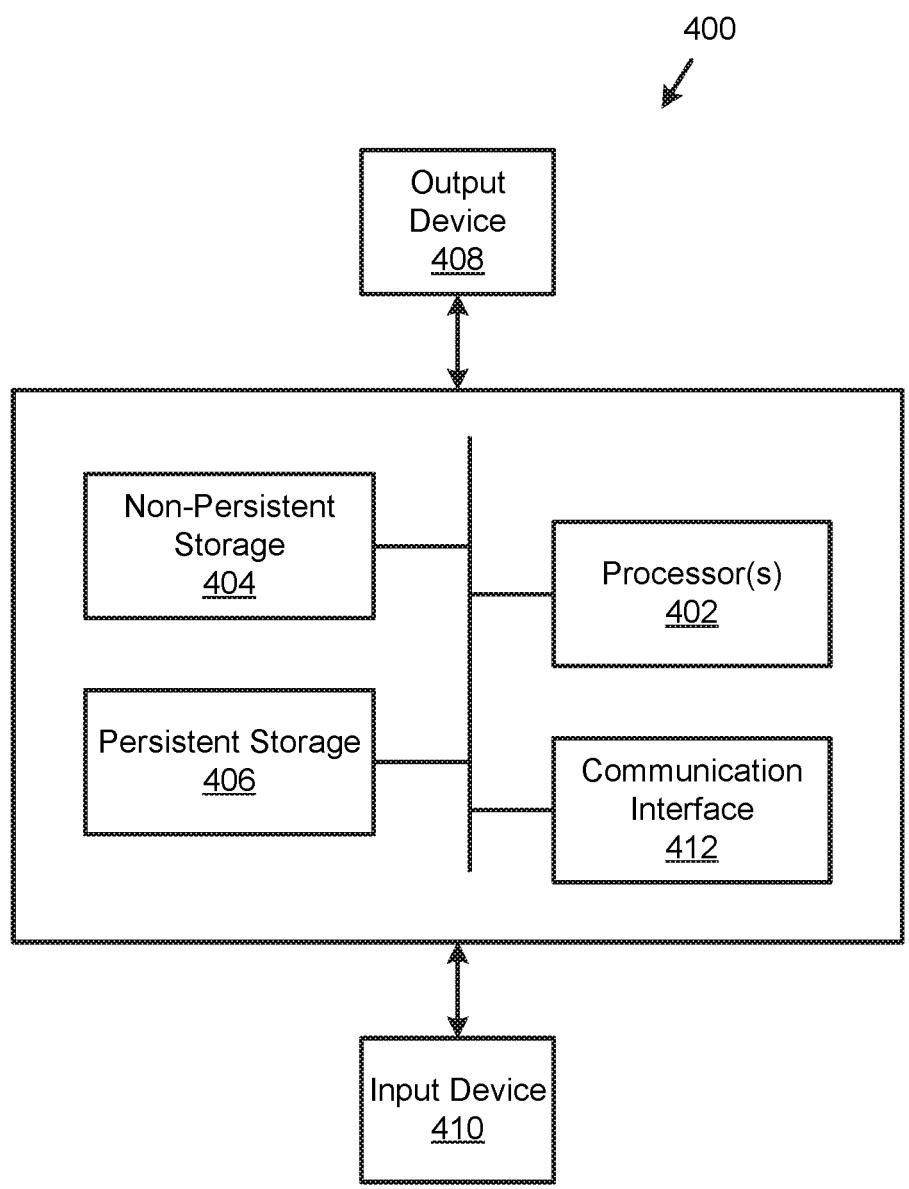
FIG. 4 shows a diagram of a computing device in accordance with one or more embodiments of the invention.

In one or more embodiments of the invention, the data management system (100) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data management system (100) described in this application and/or all, or portion, of the methods illustrated in FIGS. 2A, 2C, and 2D.

The data management system (100) may be implemented as a logical device without departing from the invention. The logical device utilizes computing resources of any number of physical computing devices to provide the functionality of the data management system (100) described throughout this application and/or all, or portion, of the methods illustrated in FIGS. 2A, 2C and 2D. For additional details regarding the data management system, see, e.g., FIG. 1C.

In one or more embodiments of the invention, the local data systems (110) are systems that obtain data, store data, provide data, and/or execute applications based on the stored data. The local data systems (110) may provide the stored data and/or applications to the clients (120) as specified by terms agreed to by the clients (120) based on transactions between the clients (120) and the local data systems (110).

In one or more embodiments of the invention, each local data system (110) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the local data system (110) described throughout this application and/or all, or portion, of the method illustrated in FIG. 2B.

A local data system (112, 114) may be implemented as a logical device without departing from the invention. The logical device utilizes computing resources of any number of physical computing devices to provide the functionality of the local data system (112, 114) described throughout this application and/or all, or portion, of the method illustrated in FIG. 2B. For additional details regarding a local data system (112, 114), see, e.g., FIG. 1B.

In one or more embodiments of the invention, the clients (120) may utilize computing resources and/or access data of the local data systems (110) based on terms (e.g., license agreements) established between the clients (120) and the local data systems (110). The clients (120) may communicate with the data management system (100) to agree upon terms for accessing the data.

In one or more embodiments of the invention, each client (122, 124) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (122, 124) described throughout this application.

A client (122, 124) may be implemented as a logical device without departing from the invention. The logical device utilizes computing resources of any number of physical computing devices to provide the functionality of the client (122, 124) described throughout this application.

In one or more embodiments of the invention, a ledger service (130) is a service that tracks how data is used and/or accessed by a client (122, 124). The information in the ledger service may be specified by the local data systems (110) and may be accessed by the data management system (100), the clients (120), and/or the local data systems (110).

In one or more embodiments of the invention, the ledger service (130) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the ledger service (130) described throughout this application and/or all, or portion, of the method illustrated in FIG. 2E.

In one or more embodiments of the invention, the ledger service (130) is implemented as a logical device. The logical device may utilize computing resources of any number of physical computing devices to provide the functionality of the ledger service (130) described throughout this application and/or all, or portion, of the method illustrated in FIG. 2E. For additional details regarding the ledger service, see, e.g., FIG. 1D.

Figure 1B:
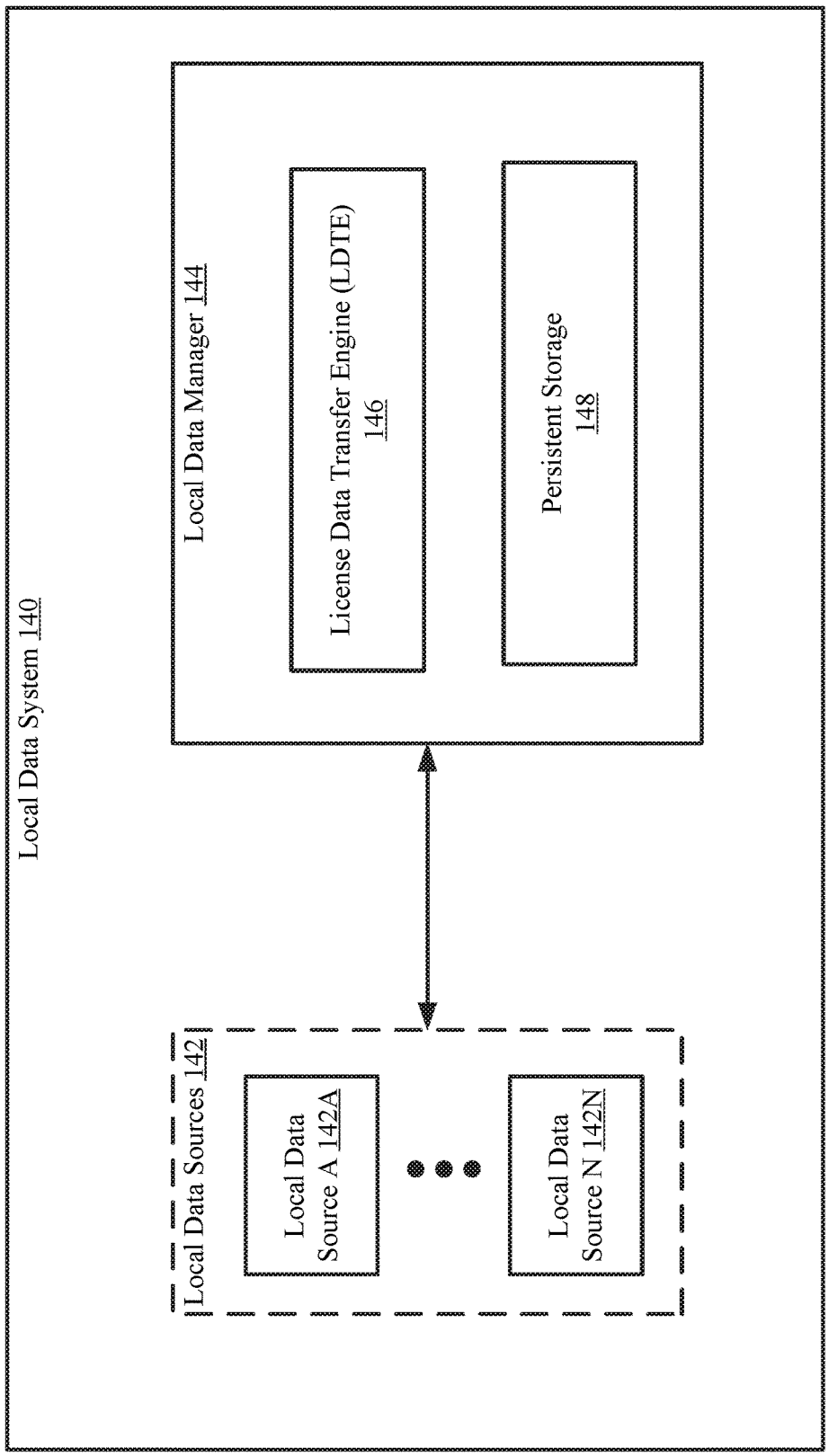
FIG. 1B shows a diagram of a local data system in accordance with one or more embodiments of the invention.

FIG. 1B shows a diagram of a local data system in accordance with one or more embodiments of the invention. The local data system (140) may be similar to a local data system (112, 114) discussed above. As discussed above, the local data system (140) may obtain data, store data, and provide data to a client. To perform the aforementioned functionality, the local data system (140) includes local data sources (142) and a local data manager (144). The local data sources (142) and the local data manager (144) may be operably connected via any combination of wired and/or wireless networks without departing from the invention. The local data system (140) may include additional, fewer, and/or different components without departing from the invention. Each of the aforementioned components is discussed below.

In one or more embodiments of the invention, the local data sources (142) are sources of data obtained from real-world processes. A data source may be, for example, a sensor. The sensor may be a hardware device for supplying data regarding a real-world process. For example, the sensor may be a count sensor that determines the number of items that are present in a particular location. The count sensor may supply the number of items to a database that stores the information on behalf of the count sensor. The sensor may be other types of sensors (e.g., distance sensors, temperature sensors, cameras, audio sensors, etc.) without departing from the invention.

In one or more embodiments of the invention, at least one of the local data sources (142A, 142N) is an Internet of things (IOT) device. For example, one of the data sources (142A) may be a camera operably connected to the Internet and that supplies data via an IOT standard to the local data manager (144). The data may be a video stream of a particular location. Image recognition may be utilized to extract relevant information from the video stream. The relevant information may be supplied to the local data manager (144) in isolation or in combination with the video stream itself.

In one or more embodiments of the invention, the local data manager (144) is a device (e.g., a computing device as shown in FIG. 4) that manages data obtained from the local data sources (142). The local data manager (144) may manage the data by storing the data in persistent storage (148) and/or providing the data to external entities (e.g., clients). The local data manager (144) includes a license data transfer engine (LDTE) (146) and persistent storage (148). The local data manager may include additional, fewer, and/or different components without departing from the invention.

In one or more embodiments of the invention, the LDTE (146) communicates with a data management system (e.g., 100, FIG. 1A) to determine whether to provide data to a client in accordance with a license agreement, which may be stored (or otherwise maintained) by the data management system. The LDTE (146) may determine, based on the communication, whether to provide the data to the client.

In one or more embodiments of the invention, the local data manager (144) provides data to a client by sending a copy of the data to the client. The data may be data stored in the persistent storage (148) and obtained from the local data sources (142).

In one or more embodiments of the invention, the data is provided to the client by allowing the client access to the data using computing resources of the local data manager (144). The client may provide credential information to the local data manager (144), and the local data manager (144), based on the credential information, may determine whether to allow the client to access the data from the persistent storage (148) of the local data manager (144). The access may include allowing a client to have read only access of the data, have read/write access to the data, make copies of the data for storage on the client (or in another location external to the local data system), any other access, or any combination thereof, in accordance with a license agreement previously established.

In one or more embodiments of the invention, LDTE (146) is a hardware device including circuitry. The LDTE (146) may be, for example, a digital signal processor, a field programmable gate array, or an application specific integrated circuit. The LDTE (146) may be other types of hardware devices without departing from the invention.

In one or more embodiments of the invention, the LDTE (146) is implemented as computing code stored on a persistent storage that when executed by a processor of the local data manager (144) performs the functionality of the LDTE (146). The processor may be a hardware processor including circuitry such as, for example, a central processing unit or a microcontroller. The processor may be other types of hardware devices for processing digital information without departing from the invention.

The persistent storage (148) may be configured to store data. The persistent storage (148) may be a physical storage. For example, the persistent storage (148) may include hard disk drives, solid state drives, and/or tape drives for storing data. The persistent storage (148) may include other types of non-transitory storage mediums without departing from the invention.

In one or more embodiments of the invention, the persistent storage (148) stores data obtained from the local data sources (142). The data stored in the persistent storage (148) may be provided to clients in accordance with one or more license agreements.

Figure 1C:
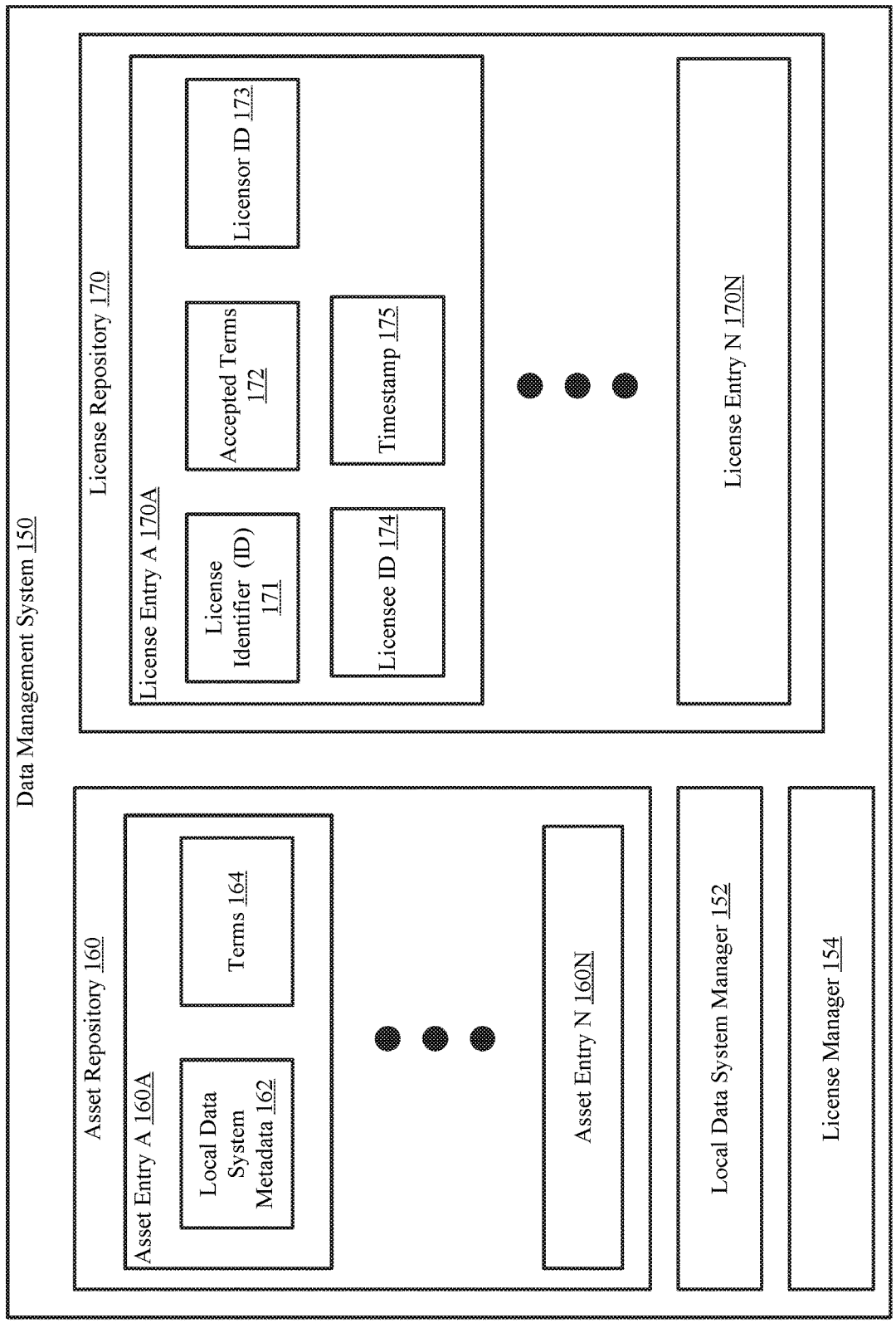
FIG. 1C shows a diagram of a data management system in accordance with one or more embodiments of the invention.

FIG. 1C shows a diagram of a data management system in accordance with one or more embodiments of the invention. The data management system (150) may be similar to the data management system (100, FIG. 1A) discussed above. The data management system (150) may include an asset repository (160), a license repository (170), a local data system manager (152), and a license manager (154). The data management system (150) may include additional, fewer, and/or different components without departing from the invention. Each component of the data management system (150) illustrated in FIG. 1C is discussed below.

In one or more embodiments of the invention, the asset repository (160) includes a number of asset entries (160A, 160N). Each asset entry may include local data system metadata (162), and terms (164). Each asset entry (160A, 160N) may include additional, fewer, and/or different data structures (or content) without departing from the invention. Each data structure illustrated for an asset entry (160A) is discussed below.

In one or more embodiments of the invention, local data system metadata (162) is a data structure that specifies information about one or more local data systems. Information of a local data system may include, for example, a geographical location, types of local data sources (e.g., a type of sensor), metadata about the data stored by the local data system, applications (e.g., algorithms) executable by the local data system, etc. The local data system metadata (162) may include other types of information without departing from the invention. Further, there may be more than one asset entry associated with each local data system.

In one or more embodiments of the invention, the terms (164) specify terms for accessing the local data system. The terms may include, for example, a price and a time window for the access, and a type of access allowed. For example, a term may specify that a local data system is to send a portion of the data stored in the local data system to a client every seven days for 28 days at a price of 50 United States Dollars (USD).

In one or more embodiments of the invention, the data management system includes a license repository (170). The license repository (170) may include a number of license entries (170A, 170N). In one or more embodiments of the invention, each license entry (170A, 170N) is associated with a license agreement. Each license entry (170A, 170N) may include a license ID (171), accepted terms (172), a licensor ID (173), a licensee ID (174), and a timestamp (175). The license entries (170A, 170N) may include additional, fewer, and/or different data structures (or content) without departing from the invention. Each data structure illustrated for a license entry (170A) is discussed below.

In one or more embodiments of the invention, each license entry (170A, 170N) is machine-readable. A license entry that is machine-readable refers to a license entry that is structured in a way wherein each portion of the license entry can be distinguished by a computing device and/or software operating on the computing device. The license entry (170A, 170N) may be structured in an extensible markup language (XML), JavaScript Object Notation (JSON), Hypertext Markup Language (HTML), and/or any other formats that may allow a machine to parse portions of the license entries (170A, 170N) without departing from the invention.

In one or more embodiments of the invention, a license identifier (ID) (171) is a data structure that specifies a license agreement between a client and a licensor. The license ID (171) may be, for example, a string of numbers, letters, symbols, or any combination thereof that uniquely identifies the license entry (170A).

In one or more embodiments of the invention, the accepted terms (172) specify terms that have been accepted by the client for this license agreement. The terms may specify, for example, an agreed-upon amount that a client (also referred to a licensee) has paid (or will pay) to obtain the license, data that is to be provided to the client by one or more local data systems (also referred to as licensed data), a time limit in which the local data system(s) may provide the licensed data (e.g., an expiration date), a period of time in which a local data system is to provide the licensed data to a client (e.g., a data set is to be provided to the client once a week for a year), and/or other information that specify terms accepted by the client for the license agreement.

In one or more embodiments of the invention, the licensor ID (173) is a data structure that specifies a legal entity that is providing the licensed data to the licensee. In one or more embodiments of the invention, a legal entity is a person, a group of people, a partnership, corporation, any other business entity, or any combination thereof. The legal entity may also be referred to as the licensor. In one or more embodiments of the invention, the legal entity owns the licensed data (or otherwise has rights to license the data) that is being provided. The legal entity may communicate via the data management system to establish the terms with the licensee and provide the licensed data to the licensee using the local data system(s). The licensor ID (173) may be, for example, a string of numbers, letters, symbols, or any combination thereof that uniquely identifies the licensor.

In one or more embodiments of the invention, the licensee ID (174) is a data structure that specifies the licensee, which is also a legal entity. The licensee ID (174) may be, for example, a string of numbers, letters, symbols, or any combination thereof that uniquely identifies the licensee.

In one or more embodiments of the invention, the timestamp (175) is a data structure that specifies a point in time in which the license agreement associated with the license entry came into effect. Alternatively, the timestamp (175) may specify a period of time in which the licensor must comply with the accepted terms (172).

In one or more embodiments of the invention, the local data system manager (152) interfaces with local data systems to enforce license agreements and accepted terms (e.g., 172). The local data system manager (152) may enforce the license agreements by obtaining license verification requests from local data systems that request verification for data that is to be provided to clients by the local data systems. The local data system manager (152) may search the license repository (170) for relevant license entries (170A, 170N) and determine whether the relevant license entries (170A, 170N) specify permitting the local data systems to provide the data to the clients. The local data system manager (152) may communicate with the local data systems based on the determination.

In one or more embodiments of the invention, the license manager (154) communicates with clients to obtain license agreements. The license manager (154) may provide one or more asset entries (160A, 160N) to the clients and, after the clients agree on terms (e.g., 164), the license manger (154) may generate license entries (170A, 170N) based on the license agreements.

Figure 1D:
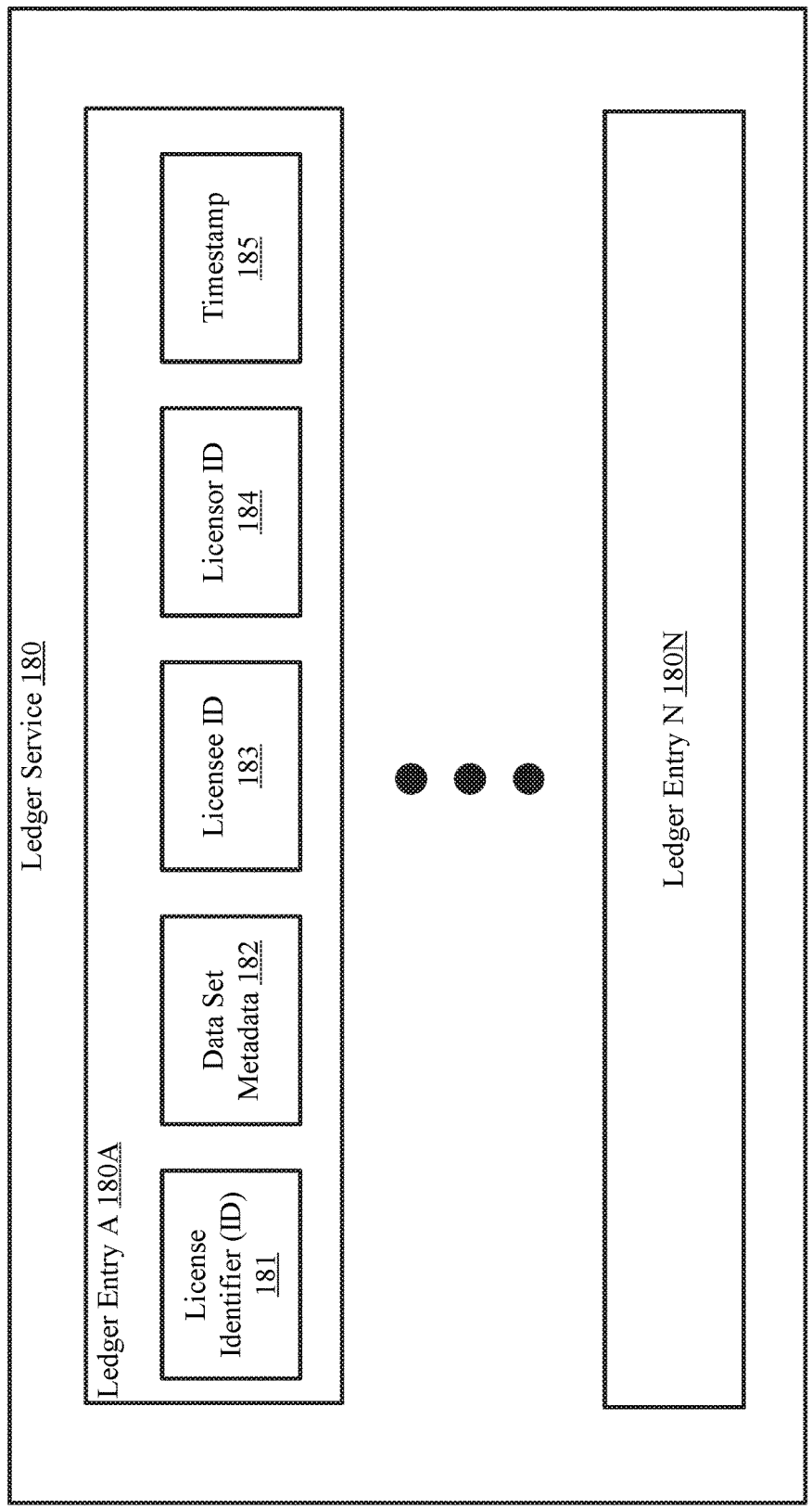
FIG. 1D shows a diagram of a ledger service in accordance with one or more embodiments of the invention.

FIG. 1D shows a diagram of a ledger service in accordance with one or more embodiments of the invention. The ledger service (180) may be similar to the ledger service (FIG. 1A, 130) discussed above. As discussed above, the ledger service (180) tracks licensed data from local data systems. To provide the aforementioned functionality, the ledger service (180) includes one or more ledger entries (180A, 180N). In one or more embodiments of the invention, each ledger entry (180A, 180N) is associated with an instance in which a local data system provides a data set to a client. A ledger entry may include a license ID (181), a data set metadata (182), a licensee ID (183), a licensor ID (184), and a timestamp (185). Each ledger service entry (180A, 180N) may include additional, fewer, and/or different data structures (or content) without departing from the invention. Each data structure illustrated for a ledger entry (180A) is discussed below.

In one or more embodiments of the invention, a license ID (181) is a data structure that specifies a license agreement between a licensee and a licensor associated with the ledger entry (170A, 170N). The license ID (181) may be, for example, a string of numbers, letters, symbols, or any combination thereof that uniquely identifies a license.

In one or more embodiments of the invention, the data set metadata (182) is a data structure that specifies a data set that has been provided to a client. In one or more embodiments of the invention, the data set metadata (182) includes information about the data set such as data type(s) for data in data set, amount of data in data set, any other information related to the data set, or any combination thereof.

In one or more embodiments of the invention, the licensee ID (183) is a data structure that specifies the licensee that obtains the data set. The licensee ID (183) may be, for example, a string of numbers, letters, symbols, or any combination thereof that uniquely identifies the licensee.

In one or more embodiments of the invention, the licensor ID (184) is a data structure that specifies the licensor provides the data set to the licensee. The licensor ID (184) may be, for example, a string of numbers, letters, symbols, or any combination thereof that uniquely identifies the licensor.

In one or more embodiments of the invention, the timestamp (185) is a data structure that specifies a point in time in which the data set was provided to the licensee. The timestamp (185) may be, for example, a date (e.g., Jan. 25, 2019) and/or a clock time (e.g., 1:00 am).

In one or more embodiments of the invention, each ledger entry (180A, 180N) is immutable. Specifically, the ledger entries (180A, 180N) may not be deleted, removed, or otherwise modified from the ledger service (180). Each ledger entry (180A, 180N) stored in the ledger service (180) may be digitally signed by, e.g., the local data manager generated the ledger entry (or by another trusted entity). In this manner, the ledger entries (180A, 180N) may provide an accurate and immutable method of tracking all data transfers that are in accordance with one or more license agreements. Therefore, other entities accessing, or otherwise requesting to access, the ledger entries (180A, 180N) may trust that the ledger entries (180A, 180N) are accurate.

FIGS. 2A-2E show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2E may be performed in parallel with any other steps shown in FIGS. 2A-2E without departing from the scope of the invention.

Figure 2A:
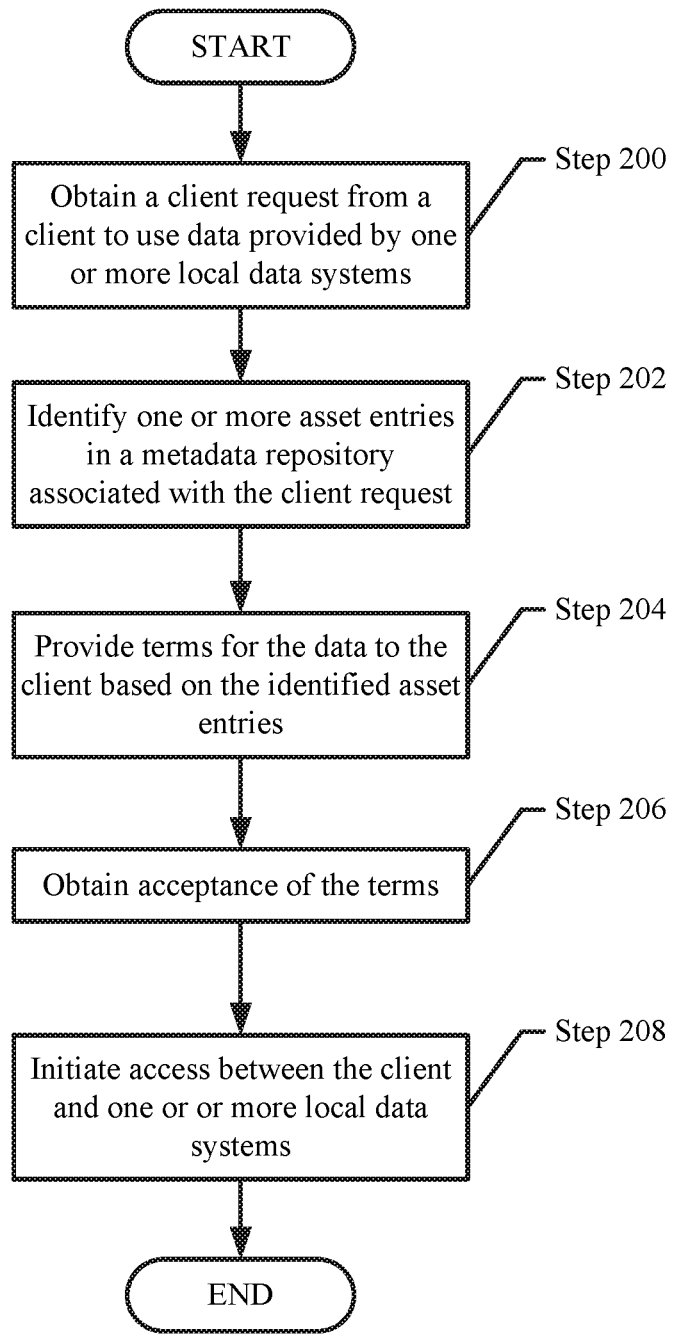
FIG. 2A shows a flowchart for obtaining license agreements in accordance with one or more embodiments of the invention.

FIG. 2A shows a flowchart for obtaining license agreements in accordance with one or more embodiments of the invention. The method shown in FIG. 2A may be performed by, for example, a data management system (100, FIG. 1A). Other components of the system illustrated in FIG. 1A may perform the method of FIG. 2A without departing from the invention.

Turning to FIG. 2A, in step 200, a client request is obtained from a client to use data provided by one or more local data systems. The request may specify the data that the client would like to use and/or a local data system from which the client would like to obtain the data. The request may specify the type of data (at any level of granularity), the type of access to data being requested, any other information, or any combination thereof.

In step 202, one or more asset entries are identified in an asset repository associated with the client request. In one or more embodiments of the invention, the asset entries are identified using the information specified in the client request. The data management system may search the asset repository to identify asset entries where local data system metadata corresponds to data and/or local data systems specified in the client request.

For example, a client request may specify a database stored in a local data system. The data management system may search for asset entries that specify the database in the local data system metadata of the asset entries.

In step 204, terms for the data identified in step 202 are provided to the client based on the identified asset entries. In one or more embodiments of the invention, the terms are presented to the clients as options (e.g., selections). Each of the terms may be associated with a different asset entry.

In one or more embodiments of the invention, the client makes a selection of one or more terms obtained from the data management system. The client may send (or otherwise provide) the selection of the terms as accepted terms. For example, the client may be presented with a graphical user interface that shows the various terms and that prompts the user of the client to accept the terms, e.g., by clicking a button on the user interface. Any other method for accepting the terms may be used without departing from the invention.

In step 206, acceptance of terms is obtained from the client. The acceptance may be memorialized in a smart contract (as discussed above). The acceptance of terms may result in a license agreement. The license agreement may be stored in a license repository as a license entry by the data management system.

Once the terms are accepted, in step 208, access between the client and one or more local data systems is initiated. In one or more embodiments of the invention, the access is initiated by sending the client credential information (e.g., a username and a password) that allows the client to access agreed-upon data stored in the local data systems. The access may be further initiated by sending the accepted terms to the local data systems. The accepted terms may specify the credential information sent to the client and the licensed data to be accessed by the client.

In one or more embodiments of the invention, the access is initiated by sending the client information for how to access the local data system. The information may be, for example, a connection path that connects the client to a local data manager of the local data system. Other methods for facilitating access to the local data system by the client may be used without departing from the invention.

Figure 2B:
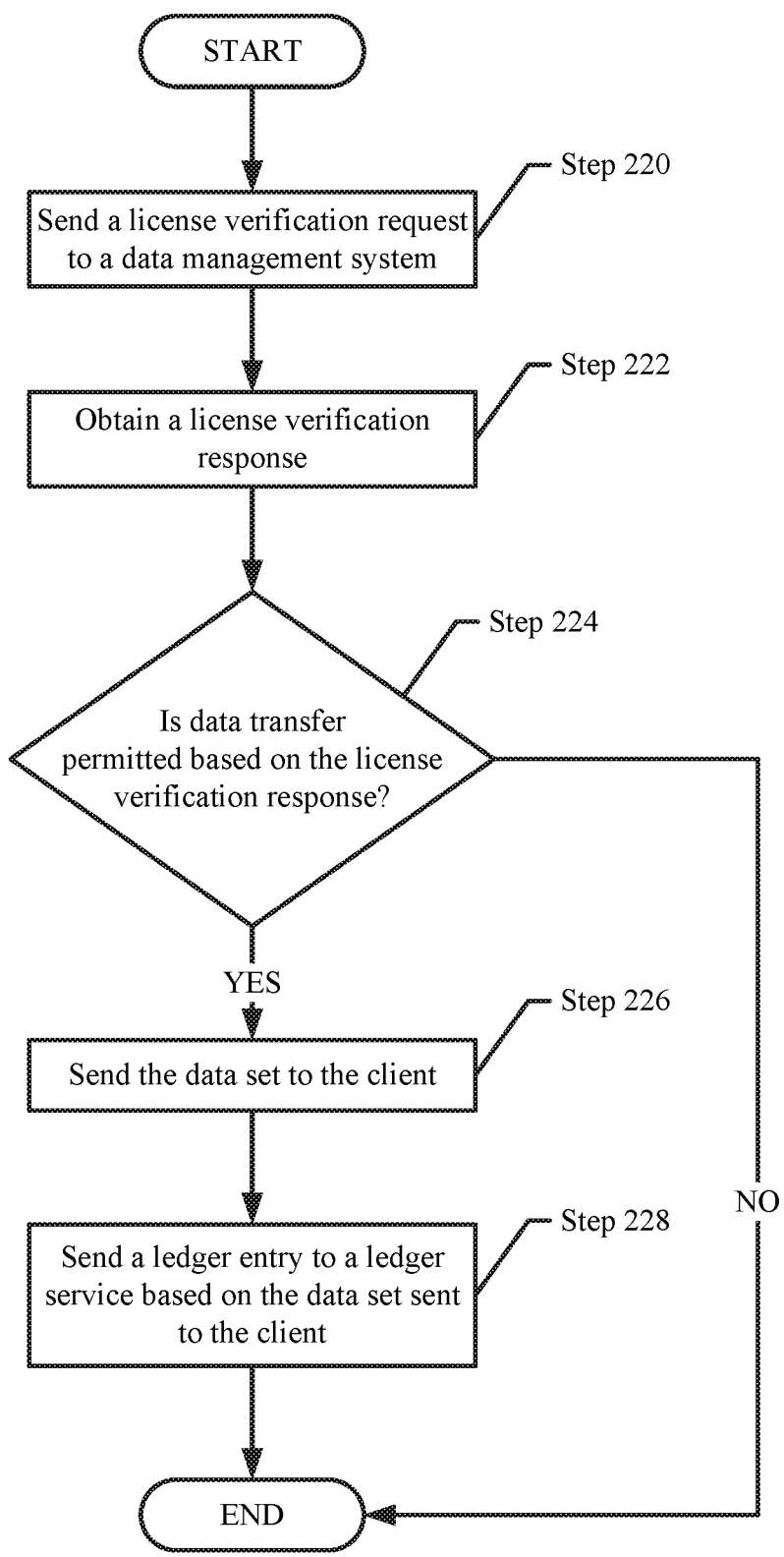
FIG. 2B shows a flowchart for managing data use operations in accordance with one or more embodiments of the invention.

FIG. 2B shows a flowchart for managing data use operations in accordance with one or more embodiments of the invention. The method shown in FIG. 2B may be performed by, for example, a local data manager (140, FIG. 1B). Other components of the system illustrated in FIG. 1A or FIG. 1B may perform the method of FIG. 2B without departing from the invention.

In step 220, a license verification request is sent to a data management system. In one or more embodiments of the invention, the license verification request may specify a data set to provide to a client. The license verification request may specify the data set and/or the client obtaining and/or otherwise accessing the data. The license verification request may be sent by a license data transfer engine (LDTE) of the local data manager.

In one or more embodiments of the invention, the license verification request is sent in response to a client requesting to obtain and/or otherwise access the data set from the local data system of the local data manager. The local data system may require information about implemented license agreements to determine whether the data set may be provided to the client. The license verification request may be sent in order to obtain the information and/or for the data management system to make the determination.

In step 222, a license verification response is obtained. The license verification response may include a determination made by the data management system about whether the data set is to be provided to the client. Further, if the license verification response specifies that the data set may be provided to the client, the license verification response may include a license agreement (or a license ID) that was used to make the determination to permit the client to obtain the data set. For additional details regarding the determination made by the data management system, see, e.g., FIG. 2C.

In step 224, a determination is made about whether the data transfer is permitted. In one or more embodiments of the invention, the data transfer is permitted based on whether the license verification response specifies that the local data system may provide the data set to the client. If the data transfer is permitted, the process proceeds to step 226; otherwise, the process ends (i.e., the data transfer is denied).

In step 226, the data set is sent to the client (or otherwise provided to the client). In one or more embodiments of the invention, the data is sent to the client via a secure connection and/or using digital encryption/signatures. In this manner, only the licensee (i.e., the client) that is intended to obtain the data set is able to access the data set.

In one or more embodiments of the invention, the data set is provided to the client by allowing the client to access the data set from the local data system. For example, the client may provide credential information that would allow the local data system to access the data set. The local data system may determine that the credential information should allow the client to access the data set. The local data system may include functionality for restricting access to other data sets stored in the local data system that are not in accordance with the agreed upon terms.

As discussed above, the local data manager may be programmed to remove access to the computing resources and/or data after the time window provided to the client has elapsed. In this manner, the client ceases to have access for a time period longer than that specified in the terms.

In step 228, a ledger entry (as discussed above) is sent to a ledger service based on that data set sent to the client. In one or more embodiments of the invention, the ledger entry specifies information about the data set that was provided to the client, the local data system that provided the data set, a timestamp in which the data was provided, and a license ID associated with the data transfer (i.e., a license that specified permission for the client to obtain the data set).

Figure 2C:
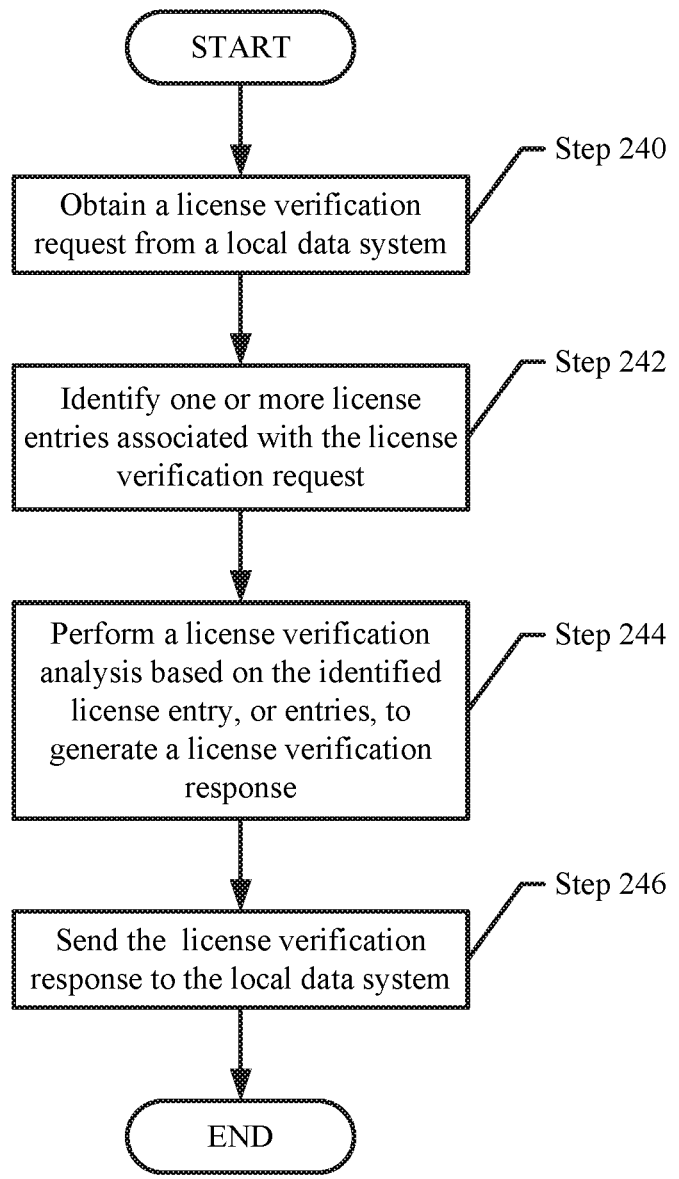
FIG. 2C shows a flowchart for managing license verification requests in accordance with one or more embodiments of the invention.

FIG. 2C shows a flowchart for managing license verification requests in accordance with one or more embodiments of the invention. The method shown in FIG. 2C may be performed by, for example, a data management system (100, FIG. 1A). Other components of the system illustrated in FIG. 1A may perform the method of FIG. 2C without departing from the invention.

In step 240, a license verification request is obtained from a local data system. In one or more embodiments of the invention, the license verification request may specify a data set, a client that wants to access the data set, a local data system that stores the data set, and/or other information regarding access between a licensor and a licensee.

In step 242, one or more license entries associated with the license verification request are identified. In one or more embodiments of the invention, the license entries are identified using a search query that include the information specified in the license verification request as inputs and results in one or more license entries that specify all or a portion of the inputs.

In step 244, a license verification analysis is performed based on the identified license entry, or entries, to generate a license verification response. In one or more embodiments of the invention, the license verification analysis includes selecting an identified license entry, determining whether the accepted terms of the selected license entry includes permitting the specified client to access the specified data set, and the repeating the aforementioned steps for all identified license entries. If any one of the identified license entries specifies allowing the data set to be provided to the client and the license entry is not expired, the data management system may determine that the client may access the data set. If none of the identified license entries specify allowing the data set to be provided to the client, or if no license entries were identified based on the inputs to the search query, the data management system may deny the client to access the data.

In one or more embodiments of the invention, the data management system generates a license verification response based on the determination discussed above. The license verification response may specify whether to allow the local data system to provide the data set to the client. If the license verification response specifies allowing the data set to be provided, the data management system may further specify the license entries using, for example, license IDs that were used to make the determination to allow the data set to be provided.

In step 246, the license verification response is sent to the local data system.

Figure 2D:
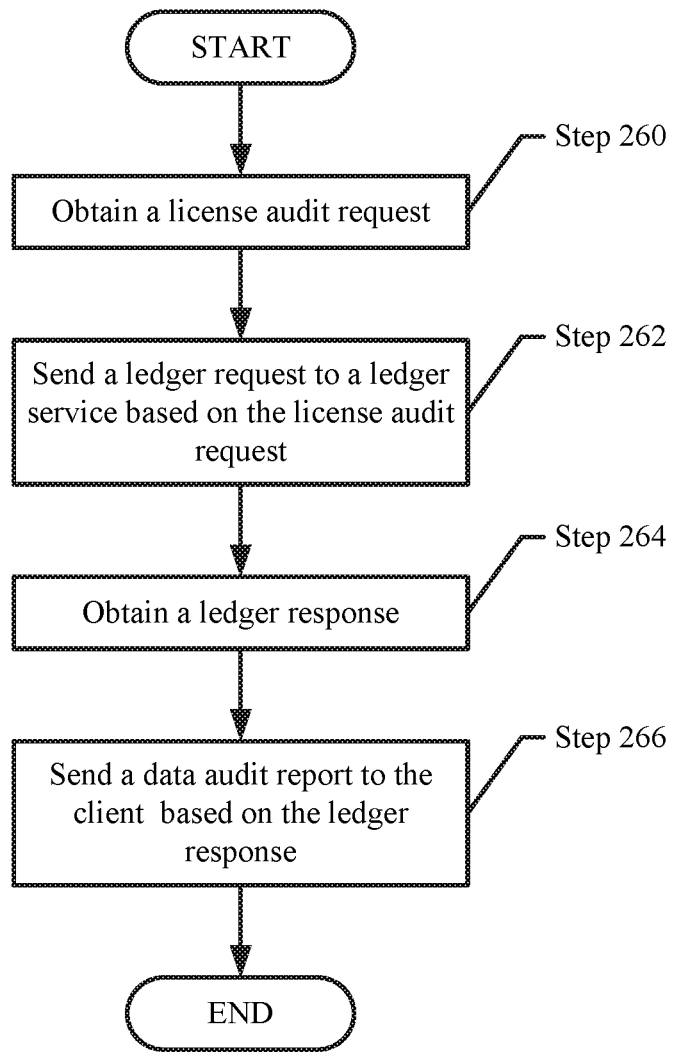
FIG. 2D shows a flowchart for managing license audit requests in accordance with one or more embodiments of the invention.

FIG. 2D shows a flowchart for managing license audit requests in accordance with one or more embodiments of the invention. The method shown in FIG. 2D may be performed by, for example, a data management system (100, FIG. 1A). Other components of the system illustrated in FIG. 1A may perform the method of FIG. 2D without departing from the invention.

Turning to FIG. 2D, in step 260, a license audit request is obtained. In one or more embodiments of the invention, the license audit request is obtained from a client. The license audit request may specify one or more data sets that a client may request to determine whether the data sets were provided to the client during a period of time.

In one or more embodiments of the invention, the license audit request specifies parameters to be searched in the ledger service. The parameters may include, for example, a licensor, one or more data sets, a time window in which data was provided to the client, one or more data sets from which data sets were provided to the client, a license agreement between the client and a licensor, other parameters, and/or any combination thereof.

In step 262, a ledger request is sent to a ledger service based on the license audit request. In one or more embodiments of the invention, the ledger request specifies the aforementioned parameters included in the license audit request.

In step 264, a ledger response is obtained. In one or more embodiments of the invention, the ledger request specifies any number of ledger entries that are associated with the parameters of the ledger request.

In step 266, a data audit report is sent to the client based on the ledger response. In one or more embodiments of the invention, the data audit report specifies the ledger entries obtained from the ledger service.

Figure 2E:
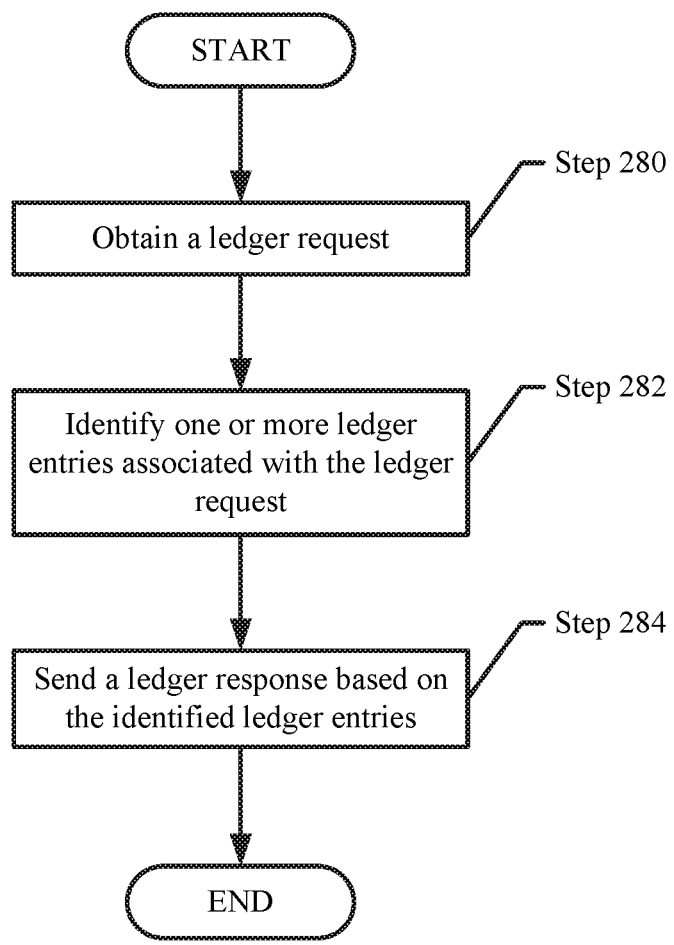
FIG. 2E shows a flowchart for managing ledger requests in accordance with one or more embodiments of the invention.

FIG. 2E shows a flowchart for managing ledger requests in accordance with one or more embodiments of the invention. The method shown in FIG. 2A may be performed by, for example, a ledger service (130, FIG. 1A). Other components of the system illustrated in FIG. 1A may perform the method of FIG. 2E without departing from the invention.

Turning to FIG. 2E, in step 280, a ledger request is obtained. In one or more embodiments of the invention, the ledger request specifies any number of parameters (discussed above) that may be associated with a ledger entry. The ledger entry may be obtained from a data management system.

In one or more embodiments of the invention, the ledger request is obtained from a data management system. The data management system may specify the parameters to audit a ledger service for information associated with the parameters. For example, a ledger request may request to obtain all ledger entries associated with a license ID to allow a data management system to determine whether all data sets associated with the license ID have been provided to the client in accordance with the accepted terms associated with the license ID.

In one or more embodiments of the invention, the ledger request is obtained from the client. The client may specify the parameters to audit a ledger service for information associated with the parameters. For example, a ledger request may request to obtain all ledger entries associated with a license ID to allow a client to determine whether all data sets associated with the license ID have been provided to the client in accordance with the accepted terms associated with the license ID.

In step 282, one or more ledger entries associated with the ledger request are identified. In one or more embodiments of the invention, the ledger entries are identified using a search query that includes the parameters as an input. Any ledger entries that may be associated with the parameters are identified by the ledger service.

In step 284, a ledger response is sent based on the identified ledger entries. In one or more embodiments of the invention, the ledger response specifies the identified ledger entries and all data associated with each identified ledger entry. The ledger response may be sent to the entity from which the ledger request was obtained.

Example

Figure 3A:
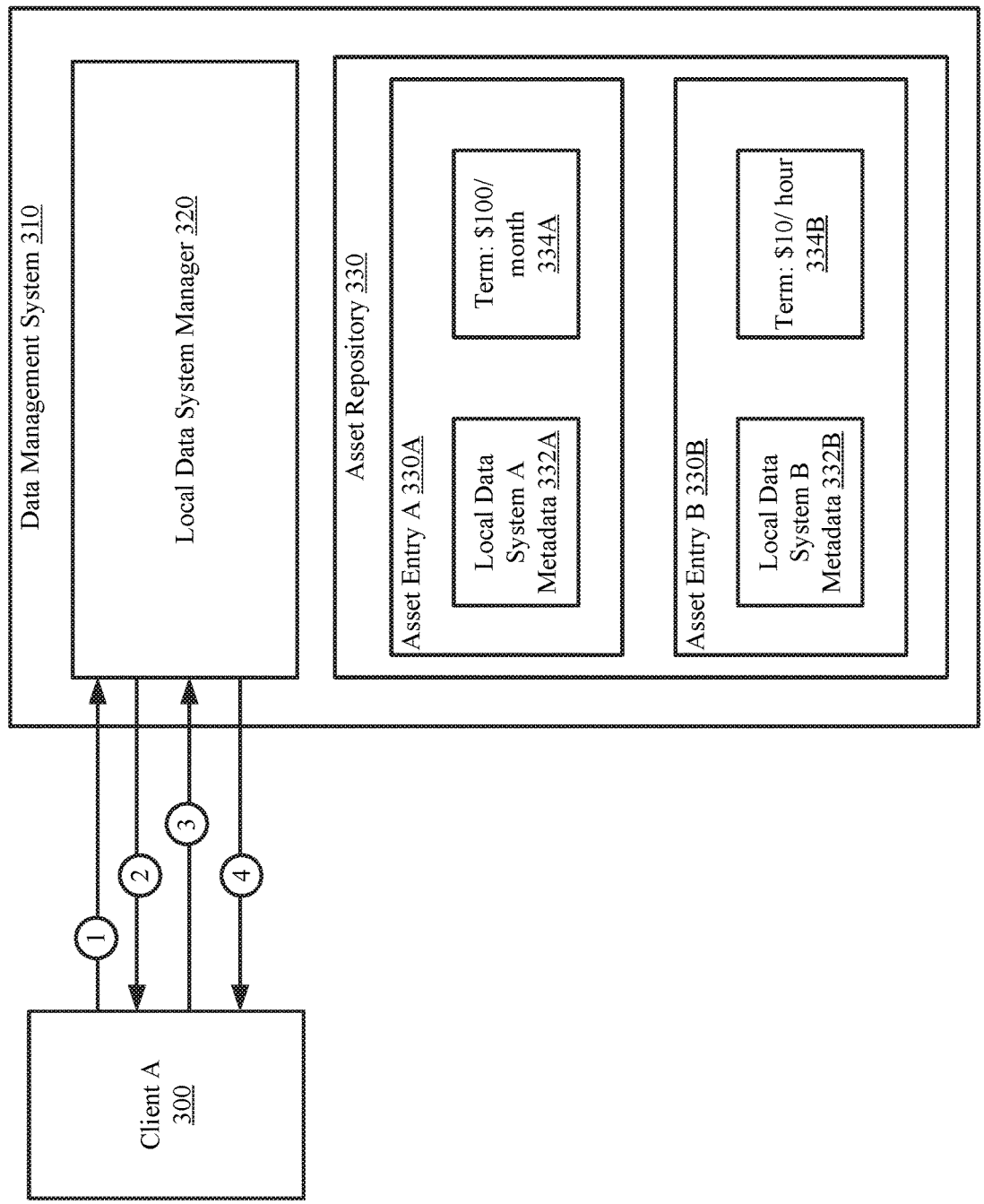
FIGS. 3A-3C show an example in accordance with one or more embodiments of the invention.
Figure 3B:
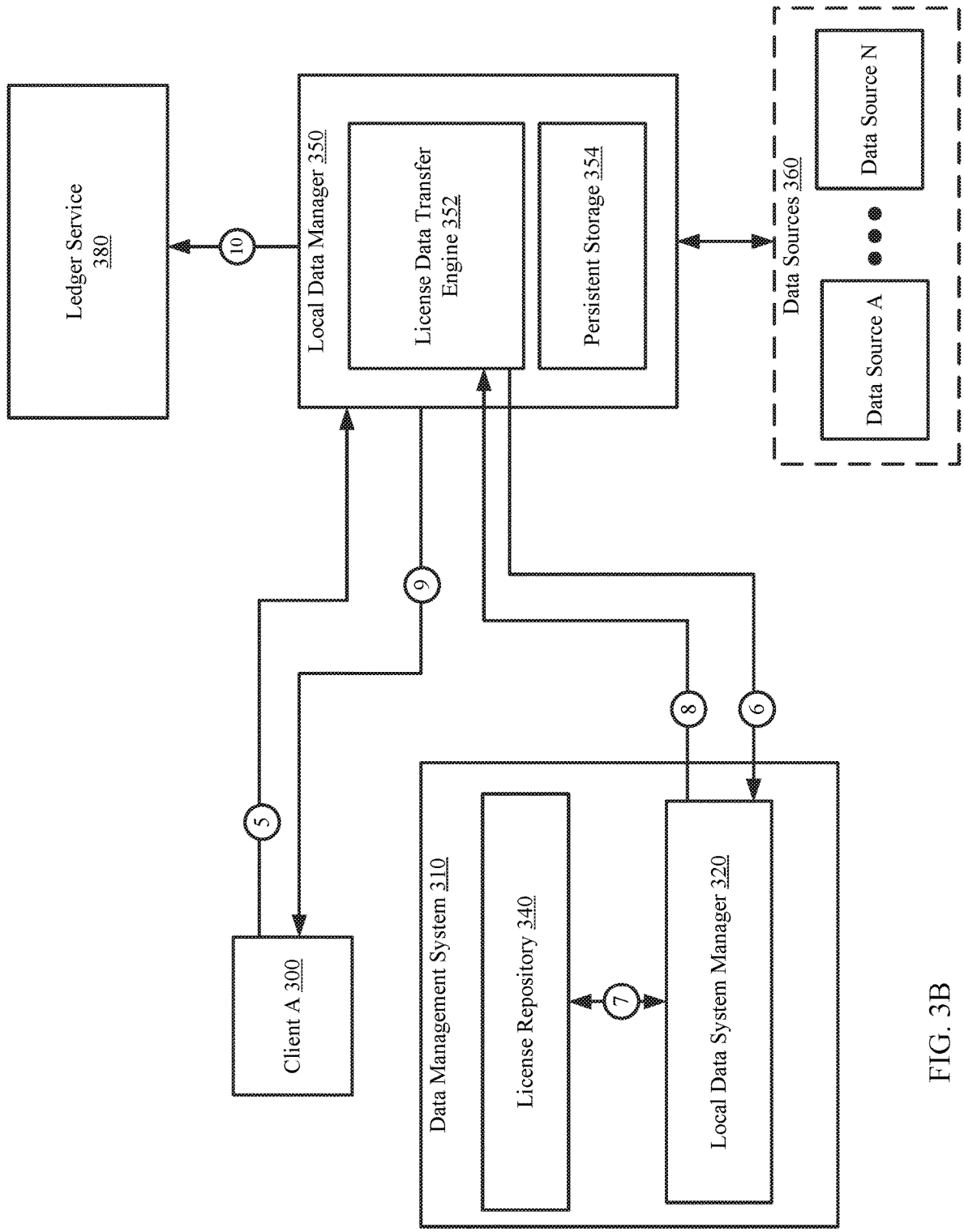
Figure 3C:
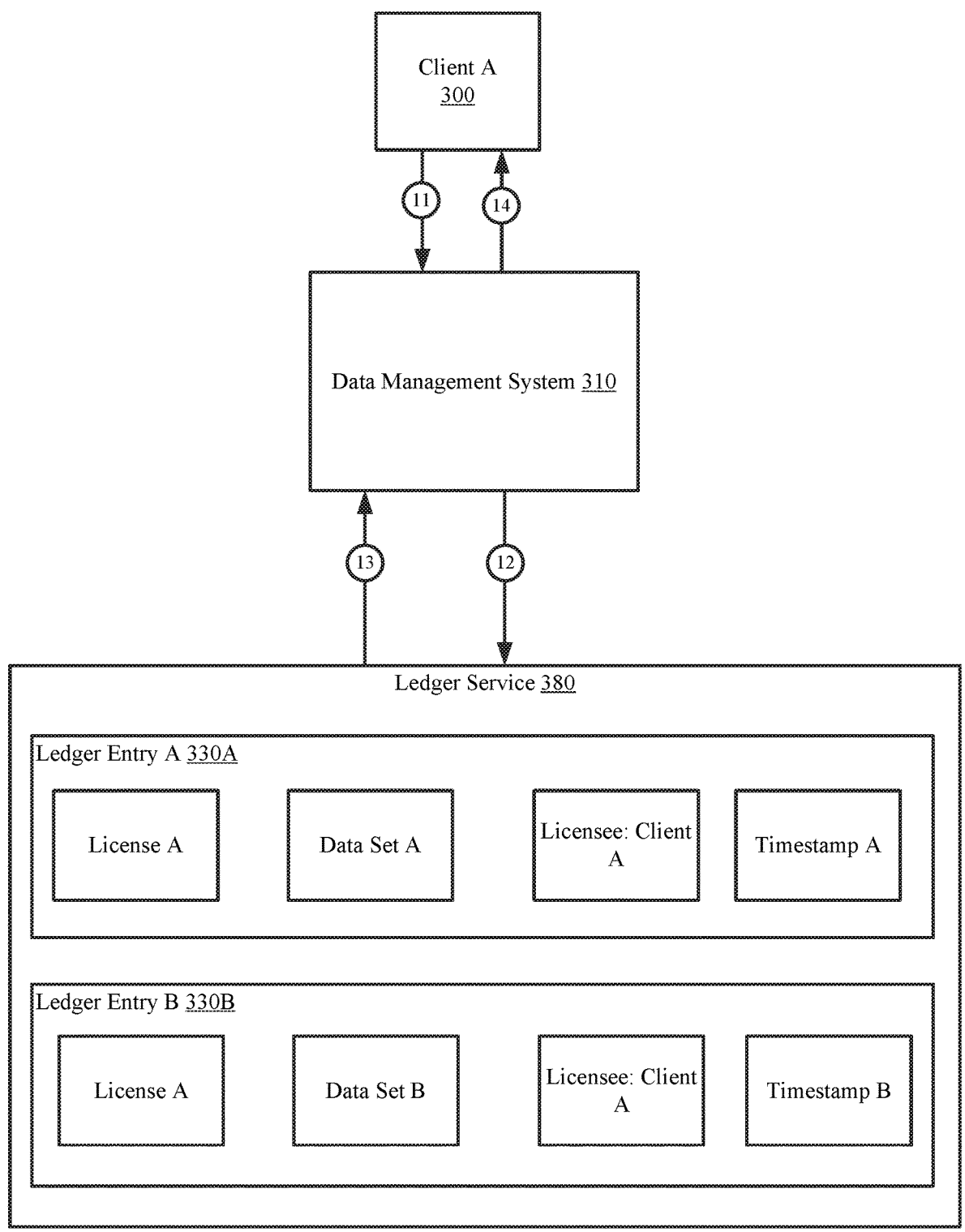

The following section describes an example. The example, illustrated in FIGS. 3A-3C, is not intended to limit the invention. Turning to the example, consider a scenario in which a client would like to obtain data that is locally stored in one or more local data systems. The data may be data streamed to a local data manager by a traffic camera from any geographical location.

FIG. 3A shows an example system in accordance with one or more embodiments of the invention. The system includes a client (300) communicating with a local data system manager (320) of a data management system (310). The client may send a request to the local data system manager (320) to access data associated with a traffic camera [1]. The local data system manager (320) searches an asset repository (330) of the data management system (310) to identify asset entries (330A, 330B) associated with the requested data. The identified asset entries (330A, 330B) include local data system metadata (332A, 332B) that each specifies a local data system and data sets A and B that are each associated with a traffic camera. The local data system manager (320) sends terms (334A, 334B) associated with the asset entries (330A, 330B) to the client (300) for review by the client (300) [2].

The client, after reviewing the terms, selects the term for asset entry A based on an expected usage of the data. The expected usage may be for a time period of two months. The client may send the selection to the local data system manager (320) as an acceptance of the selected term [3].

The local data system manager (320), in response to the acceptance of the term, may send access information to the client that specifies how to access the local data system (local data system A) [4]. The access information may be a hyperlink sent via email to the client. The hyperlink provides the client a path for connecting to a local data manager of local data system A. Further, the data management system (310) stores a license entry in a license repository (not shown in FIG. 3A) that specifies the client, the licensor (local data system A), accepted terms that specify the licensed data that is to be provided, and a time stamp.

The client (300) may provide credential information to the local data manager (350) and send a client request to access data sets A and B stored in persistent storage (354) of the local data manager (350), as seen in FIG. 3B. The client request may be sent to a license data transfer engine (352) of the local data manager (350). The license data transfer engine (352) may send a license verification request to a local data system manager (320) [6].

The local data system manager (320), in response to the license verification request, searches the license repository (340) for a license that specifies the licensee (client A), the licensor (local data system A), the data sets requested by the client in the client requests (data sets A and B), and/or any combination thereof [7]. The local data system manager (320) identifies a license that includes accepted terms that specify allowing the client (300) to obtain data sets A and B. The local data system manager (320) may send a license verification response to the license data transfer engine (352) that specifies allowing the client to obtain data sets A and B [8].

The license data transfer engine (352), in response to the license verification request, determines that the client may obtain the data sets. The local data manager (350) sends data set A to the client at a first point in time and sends data set B at a second point in time [9]. After providing the data to the client (300), the local data manager stores two ledger entries in a ledger service (380) [10]. The ledger entries may each specify one of the data sets and the respective point in time in which the data set was sent to the client (300).

At a later point in time, a user of the client (300) makes a determination that not all of the data was provided to the client (300). Turning to FIG. 3C, the client (300) sends a license audit request to the data management system (310) to obtain information about the licensed data that was provided to the client (300) in accordance with a license agreement [11].

The data management system (310), in response to the license audit request, sends a ledger request to the ledger service (380) [12]. The ledger request specifies the following parameters: data set A, data set B, license A (which is a license ID for the license discussed above), and licensor ID=client A. The ledger service takes those parameters as inputs to a search query that results in ledger entries A (330A) and B (330B). The ledger service (380) may send a ledger response to the data management system (310) that specifies the ledger entries (330A, 330B) [13]. The data management system (310) may use the ledger response to generate a license audit report that specifies the ledger entries and/or the licensed data that has been provided to the client. The data management system (310) sends the license audit report to the client (300) [14].

The client (300) may take the license audit report to determine that data sets A and B have been provided to the client and a breach of a license agreement was not committed by the local data system.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of providing licensed data to a client by having the local data systems that store licensed data communicate with a data management system that stores the license agreements. The local data systems may use the communication to determine whether to provide licensed data to the client even when the license agreement is established in a remote location (e.g., in a cloud-based infrastructure).

Further, embodiments of the invention improve the reliability of providing the licensed data by implementing a ledger service that stores immutable ledger entries wherein each ledger entry specifies an instance in which a data set of licensed data was provided to a client by a local data system. Embodiments of the invention may audit the ledger service to accurately determine what data has been provided to a client in the event that the client makes a claim that specifies not obtaining requested data.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
sending, by a licensed data transfer engine executing on a local data manager, a license verification request to a data management system;
obtaining a license verification response, wherein the license verification response specifies that a client may obtain a data set;
in response to the license verification response, providing, by the local data manager, the data set to the client, wherein the data set is generated using local data sources operatively connected to the local data manager; and
sending a ledger entry to a ledger service based on the data set provided to the client;
after sending the ledger entry to the ledger service:
obtaining, by the data management system, a license audit request from the client;
sending a ledger request to the ledger service based on the license audit request;
receiving a ledger response,
wherein the ledger response comprises the ledger entry, wherein the ledger entry comprises a client identifier, a licensor identifier, a timestamp, and data set metadata associated with the data set,
wherein the data set metadata comprises a data type and an amount of data; and
sending a data audit report based on the ledger response to the client.

2. The method of claim 1, wherein the ledger entry is immutable.

3. The method of claim 1, wherein the data set is specified by a license entry in the data management system.

4. The method of claim 3, wherein the license entry further specifies an accepted term, a licensor, a licensee, and a timestamp.

5. The method of claim 4, wherein the license entry is stored in a machine-readable format.

6. A non-transitory computer readable medium comprising computer readable program code, which when executed by a computer processor enables the computer processor to perform a method, the method comprising:
sending, by a licensed data transfer engine executing on a local data manager, a license verification request to a data management system;
obtaining a license verification response, wherein the license verification response specifies that a client may obtain a data set;
in response to the license verification response, providing, by the local data manager, the data set to the client; and
sending a ledger entry to a ledger service based on the data set provided to the client;
after sending the ledger entry to the ledger service:

obtaining, by the data management system, a license audit request from the client;
sending a ledger request to the ledger service based on the license audit request;
receiving a ledger response,
wherein the ledger response comprises the ledger entry, wherein the ledger entry comprises a client identifier, a licensor identifier, a timestamp, and data set metadata associated with the data set,
wherein the data set metadata comprises a data type and an amount of data; and
sending a data audit report based on the ledger response to the client.

7. The non-transitory computer readable medium of claim 6, wherein the ledger entry is immutable.

8. The non-transitory computer readable medium of claim 6, wherein the data set is specified by a license entry in the data management system.

9. The non-transitory computer readable medium of claim 8, wherein the license entry further specifies an accepted term, a licensor, a licensee, and a timestamp.

10. The non-transitory computer readable medium of claim 9, wherein the license entry is stored in a machine-readable format.

11. A system, comprising:
a processor;
memory comprising instructions, which when executed by the processor, perform a method, the method comprising:
sending, by a licensed data transfer engine executing on a local data manager, a license verification request to a data management system;
obtaining a license verification response, wherein the license verification response specifies that a client may obtain a data set;
in response to the license verification request, providing data set to the client;
sending a ledger entry to a ledger service based on the data set provided to the client;
after sending the ledger entry to the ledger service:
obtaining, by the data management system, a license audit request from the client;
sending a ledger request to the ledger service based on the license audit request;
receiving a ledger response,
wherein the ledger response comprises the ledger entry, wherein the ledger entry comprises a client identifier, a licensor identifier, a timestamp, and data set metadata,
wherein the data set metadata comprises a data type and an amount of data associated with the data set; and
sending a data audit report based on the ledger response to the client.

12. The system of claim 7, wherein the ledger entry is immutable.

13. The system of claim 11:
wherein the data set is specified by a license entry in the data management system; and
wherein the license entry is stored in a machine-readable format.

14. The system of claim 13, the license entry further specifies an accepted term, a licensor, a licensee, and a timestamp.

* * * * *